Patented Jan. 22, 1952

2,583,024

UNITED STATES PATENT OFFICE 2,583,024

METHOD OF SURFACE TREATMENT OF MOLDED MATERIAL

Joseph J. Strobel, Washington, D. C.

No Drawing. Application March 19, 1948,
Serial No. 15,951

4 Claims. (Cl. 117—64)

(Granted under the act of March 3, 1883, as amended April 30, 1928; 370 O. G. 757)

The present invention relates to a method of surface treatment of molded material and more particularly to a method of surface treatment for low pressure molded glass cloth laminated resinous material.

It has been found in applying a finish coating to low pressure molded resinous material containing glass cloth laminations that it is impractical to apply a protective or decorative coating thereto without prior surface treatment of the material with a compound to fill small pits or holes occurring in the surface thereof. Such pits or holes contain air which blows through or causes bubbles in the protective coating as it is applied, thereby causing imperfections in the coating and impairing the effectiveness thereof to seal the porosity of the material.

The usual methods of preparing the surface such, for example, as the application of putty-like fillers and dry sanding have been found to be not entirely satisfactory for the purpose intended, for the reason that such fillers are difficult to apply, and, because of shrinkage of the fillers due to solvent evaporation, more than one application of the filler is necessary to fill the holes and pits. It has also been found that dry sanding has a tendency to pull up glass fibers from the surface of the material and to uncover further imperfections in the material.

The method of the present invention overcomes the foregoing disadvantages and seals the surface in an efficient and thorough manner, the heat curable filling compound produced by this method becoming an integral part of the molded material during the process. Furthermore, surface ridges occurring at the glass cloth intersections are removed. The surface is thus rendered smooth and adaptable to the adhesion of the protective or decorative coating when applied thereto.

An object of the present invention is to provide a new and improved method for treating the surface of a low pressure molded laminate to rid the surface of holes and blemishes.

Another object is to provide a new and improved method of surface treatment for a low pressure molded laminate which renders the surface suitable for the successful application and adhesion of protective or decorative coatings applied thereto.

Still another object is to provide a method employing a heat curable filler for the treatment of the surface of a low pressure molded laminate in which the filler becomes an integral part of the molded material.

A further object is to provide a wet sanding or abrading method of treating the surface of low pressure molded laminates in which a simultaneous smoothing and filling of the surface is accomplished during the surface treatment.

A still further object is to provide a method of preparing the surface of low pressure molded laminates which is economical, well adapted for the purpose intended and which provides durable results.

Still further objects and advantages will become apparent from a consideration of the following specification.

In the particular embodiment of the invention here chosen for the purposes of illustrating and explaining the broad principles involved, the method of the present invention has been described in particularity for use with a low pressure molded heat cured laminate containing glass cloth and a resin compound such, for example, as "Selectron" 5003 resin which comprises propylene maleate phthalate containing approximately 34% monomeric styrene. In practicing the method of the present invention the surface of the aforementioned laminate is treated by applying thereto a thin coat of low viscosity, 100 percent reactive, heat curable, liquid resin such, for example, as duPont "BCM" resin which comprises essentially tetraethyleneglycol dimethacrylate made from a mixture of higher glycols, activated with .2 percent lauroyl peroxide, as a wet sanding or abrading medium. The lauroyl peroxide acts as a catalyst in the liquid resin to promote the quick curing thereof. The phrase "100 percent catalyst activated resinous liquid" as employed in this specification is indicative of a liquid resin having the quality of retaining its full quantity during the drying and curing processes, there being no loss nor shrinkage of the resin by reason of evaporation or other causes.

The surface is now subjected to a hand sanding or abrading operation. The residue resulting during the sanding operation mixes with the liquid resin to produce a sealing compound which is forced into the surface holes by the hand sanding operation. The surface ridges and other surface high spots are also partially removed by the aforementioned sanding operation.

The hand sanding is discontinued when the surface of the applied resin appears to be dry. This surface is then subjected to a mechanical sanding operation until the surface feels dry to the touch of the operator, and all remaining surface irregularities are removed.

A second very light coat of liquid resin is now applied to the surface and the molded material is placed in an oven and subjected to a heat of approximately 125 degrees centigrade for twenty-five minutes. The material is now removed from the oven, cooled, and thereafter lightly dry sanded, the surface now being in readiness for a protective or decorative coating to be applied thereto.

As will be apparent from the foregoing description there has been provided a method for preparing the surface of low pressure molded glass cloth laminate material in which holes and other surface imperfections are treated in such a manner as to present a smooth surface well adapted to the application of a protective or ornamental coating.

Obviously many modifications and variations of the present invention are possible in the light of the above teachings. It is therefore to be understood that within the scope of the appended claims the invention may be practiced otherwise than as specifically described.

The invention described herein may be manufactured and used by and for the Government of the United States of America for governmental purposes without the payment of any royalties thereon or therefor.

What is claimed as new and desired to be secured by Letters Patent of the United States is:

1. The method of treating surfaces of articles molded from glass cloth laminations with a heat curable resin binder comprising propylene maleate phthalate containing approximately 34% monomeric styrene comprising the steps of applying to the surface a thin coat of a low viscosity 100% reactive heat curable liquid resin comprising tetraethyleneglycol dimethacrylate made from a mixture of higher glycols and activated by a suitable catalyst comprising 0.2% lauroyl peroxide; sanding said surface until it is substantially dry; applying a second thin coat of said activated liquid resin; and heat curing said surface by subjecting the article to heat of approximately 125° C. for about 25 minutes.

2. The method of treating surfaces of articles molded from glass cloth laminations with a heat curable resin binder comprising propylene maleate phthalate containing approximately 34% monomeric styrene comprising the steps of applying to the surface a thin coat of a 100% reactive heat curable resin comprising tetraethyleneglycol dimethacrylate made from a mixture of higher glycols and activated by a suitable catalyst comprising 0.2% lauroyl peroxide, sanding said surface until it is substantially dry, applying a second thin coat of said activated liquid resin, and heat curing said surface.

3. The method of treating surfaces of articles molded from fabric glass cloth laminations with a heat curable resin binder comprising propylene maleate phthalate containing approximately 34% monomeric styrene comprising the steps of applying to the surface a thin coat of a 100% reactive heat curable liquid resin comprising tetraethyleneglycol dimethacrylate made from a mixture of higher glycols activated by a suitable catalyst, sanding said surface until it is substantially dry, applying a second thin coat of said activated liquid resin, and heat curing said surface by subjecting the article to heat of approximately 125° C. for about 25 minutes.

4. The method of treating surfaces of articles molded from fabric laminations with a heat curable resin binder comprising propylene maleate phthalate containing approximately 34% monomeric styrene comprising the steps of applying to the surface a thin coat of a 100% reactive heat curable resin comprising tetraethyleneglycol dimethacrylate made from a mixture of higher glycols, sanding said surface until it is substantially dry, applying a second thin coat of said activated liquid resin; and heat curing said surface.

JOSEPH J. STROBEL.

REFERENCES CITED

The following references are of record in the file of this patent:

UNITED STATES PATENTS

| Number | Name | Date |
| --- | --- | --- |
| 49,192 | Bicker | Aug. 1, 1865 |
| 1,904,417 | Crystler | Apr. 18, 1933 |
| 2,076,509 | Whitelaw | Apr. 6, 1937 |
| 2,204,859 | Hyatt | June 18, 1940 |
| 2,279,630 | McMahon | Apr. 14, 1942 |
| 2,370,562 | Meunier | Feb. 27, 1945 |
| 2,484,756 | Snow | Oct. 11, 1949 |

FOREIGN PATENTS

| Number | Country | Date |
| --- | --- | --- |
| 578 | Great Britain | 1884 |